(12) United States Patent
Beck

(10) Patent No.: US 10,694,774 B2
(45) Date of Patent: Jun. 30, 2020

(54) AUTOMATIC GRINDER

(71) Applicant: Michael Beck, Lauderdale, MN (US)

(72) Inventor: Michael Beck, Lauderdale, MN (US)

(*) Notice: Subject to any disclaimer, the term of this patent is extended or adjusted under 35 U.S.C. 154(b) by 585 days.

(21) Appl. No.: 15/424,317

(22) Filed: Feb. 3, 2017

(65) Prior Publication Data
US 2017/0215469 A1 Aug. 3, 2017

Related U.S. Application Data

(60) Provisional application No. 62/290,729, filed on Feb. 3, 2016.

(51) Int. Cl.
| | | |
|---|---|---|
| A23B 7/04 | (2006.01) |
| A24B 7/04 | (2006.01) |
| A47J 42/06 | (2006.01) |
| B07B 13/00 | (2006.01) |
| B02C 23/10 | (2006.01) |
| B07B 1/00 | (2006.01) |

(52) U.S. Cl.
CPC .............. *A24B 7/04* (2013.01); *A47J 42/06* (2013.01); *B02C 23/10* (2013.01); *B07B 13/00* (2013.01); *B07B 1/00* (2013.01)

(58) Field of Classification Search
CPC ........... B07B 1/00; B07B 13/00; B07B 13/03; 02C 23/10; A24B 7/04; A47J 42/06; A01F 7/00; A01F 7/02; A01F 7/06; A01F 12/18; A01F 12/20; A01F 12/22; A01F 12/24; A01F 12/56
See application file for complete search history.

(56) References Cited

U.S. PATENT DOCUMENTS

| | | | | |
|---|---|---|---|---|
| 4,121,779 A | | 10/1978 | Mills et al. | |
| 4,572,216 A | * | 2/1986 | Josuttis ................ | A24O 5/42 131/70 |
| 2006/0261197 A1 | * | 11/2006 | Chan .................... | A47J 42/06 241/169.1 |
| 2016/0029691 A1 | * | 2/2016 | Ruzycky ............... | A24C 5/02 241/24.1 |

* cited by examiner

*Primary Examiner* — Charles A Fox
*Assistant Examiner* — Kalyanavenkateshware Kumar
(74) *Attorney, Agent, or Firm* — Westman, Champlin & Koehler, P.A.; Amanda M. Prose

(57) ABSTRACT

An apparatus and method for automatically preparing ground consumable plant material for smoking, wherein the apparatus can repeat the method quickly. The apparatus comprises an outer shell which protects the separating unit which is configured to hold the raw consumable material while simultaneously pushing micro bits of ground consumable material through small apertures, thus extracting all unwanted raw material. The separation unit further comprises a screen which the ground consumable material rolls over to aid in the collection of the consumable pollen. While the outer shell further comprises a funnel to aid in the delivery of the ground consumable material to a smoking device.

14 Claims, 1 Drawing Sheet

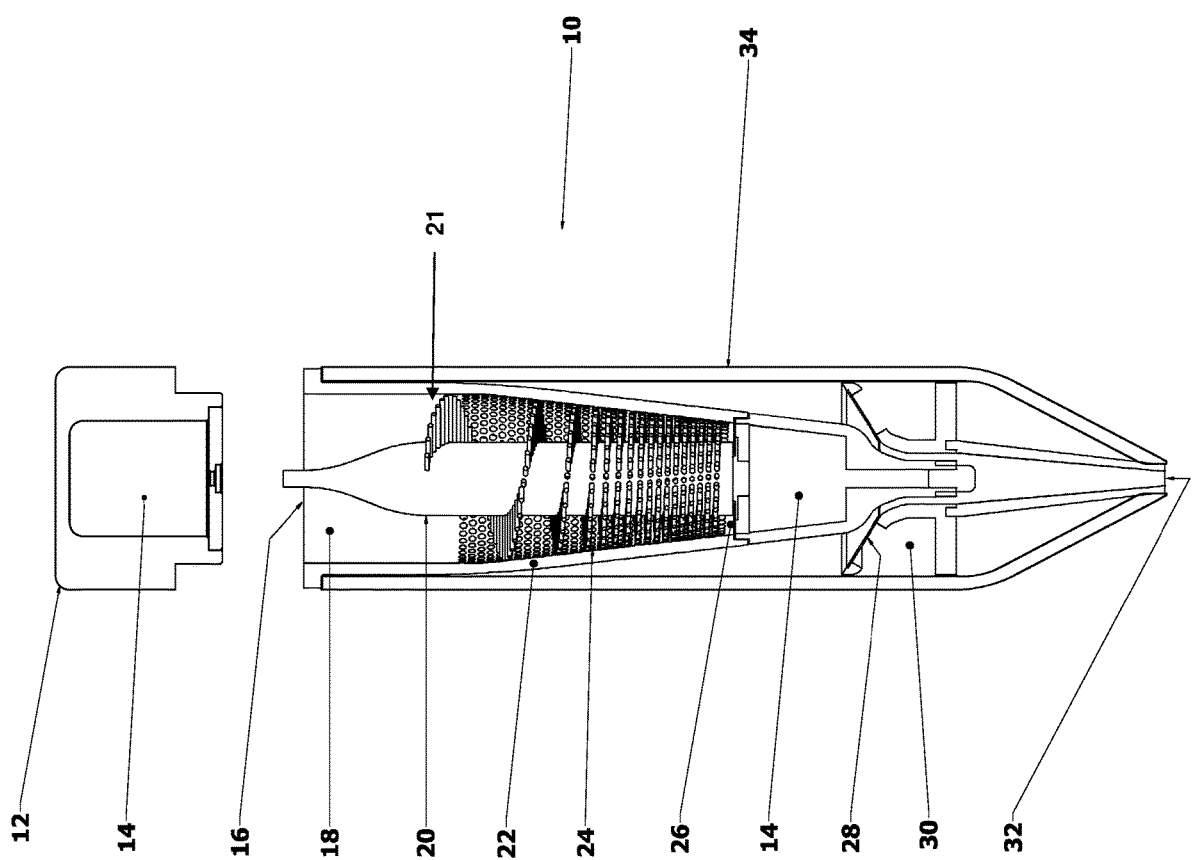

AUTOMATIC GRINDER

CROSS-REFERENCE TO RELATED APPLICATIONS

This application claims priority from U.S. provisional application Ser. No. 62/290,729, filed on Feb. 3, 2016, the contents of which are herein incorporated in its entirety.

SUMMARY

The present disclosure relates to an apparatus for automatically and quickly preparing a ground consumable material for easy delivery to a smoking device. The apparatus comprises a shell which encases a separation unit for storing and separating ground consumable material from raw material. The separation unit is configured in such a way that bristles rotate inside the unit causing the raw consumable material to diminish in size. The separation unit also comprises small apertures, such as holes, where the apertures are configured to allow only particles of the ground consumable material of a size less than the apertures to pass through, thus leaving unwanted raw material behind. Once the ground consumable material is ground, it flows down the outer shell and over a pollen collection screen, which is configured to remove pollen from the ground consumable material before it is funneled into the appropriate smoking device.

Another aspect of the present disclosure relates to a method of automatically preparing a ground consumable material for easy delivery to a smoking device. The method includes steps which are completed automatically and the steps comprising delivery of raw consumable material into the upper part of a separation unit for storage until needed. The method further includes the rotation of a removable shaft with bristles, which is configured to break down the size of the raw consumable material. The method also includes small apertures, such as holes, which are configured to extract the ground consumable material such that only particles of the raw consumable material smaller than a selected size will pass through the apertures, thus leaving all unwanted raw material or un-ground particles behind as waste. The method further comprises delivering and/or funneling the ground consumable material to the pollen screen for removing pollen from the ground consumable material and then delivering the ground consumable material to a smoking device. The method is repeatable in order to quickly and sequentially load a plurality of devices.

BRIEF DESCRIPTION OF THE DRAWINGS

FIG. 1 is a side view on the inside components of an automatic grinder.

DETAILED DESCRIPTION

An apparatus 10 for preparing ground consumable material is illustrated generally at 10 in FIG. 1. The apparatus 10 comprises a housing 34 having an inlet end 16 and an outlet end 32 and a housing body 34 extending there between. The outlet end 32 may for example, be a nozzle or have a funnel shape such that the outlet end 32 has a smaller diameter than the inlet end 16 and/or the housing body 34. The inlet end 16 is open and a removable cap or lid 12 is securable thereto for closing off the inlet end 16 of the apparatus 10.

The apparatus 10 of FIG. 1 may be configured such that a user utilizes the apparatus 10 by loading a supply of raw consumable material into the inlet end 16 and grinding at least a portion of the raw consumable material in the separation unit 22 of the grinding apparatus 10 by passing at least some of the portion of the ground consumable material in the separation unit 22 through an aperture 24. The extracted or prepared ground consumable material can then be delivered to a smoking device. The apparatus 10 is also configured for storing at least a portion of the raw consumable material in the grinding device that is not directed to the separation unit 22. This may be done by rotating cap or lid 12 to rotate a shaft 20. Additionally or alternatively, electrical components 14, such as a battery and motor, may be coupled to the shaft 20 and configured to rotate the shaft 20.

The apparatus 10 comprises a first holding area 18 configured to store a supply of the raw consumable material. Examples of suitable raw consumable materials for use with this device include, but are not limited to natural and/or plant based consumable materials as well as various synthetic materials amenable to smoking. For example, these materials may include raw plant derived materials including the flower, leaves, stems, seeds, roots or combinations thereof.

Within the separation unit 22 is a series of apertures 24 having a size sufficient to only allow crushed, ground or pulverized bits of the ground consumable material to pass there through as illustrated in FIG. 1. The apertures 24 may be positioned in, on or around an exterior surface of a separation unit 22 of the apparatus 10; the separation unit 22 is configured to reduce the size of a portion of the supply of the raw consumable material. The apparatus 10 also includes a second holding area 26 configured to hold unwanted raw material larger than a selected size, that is, the material that is not able to pass through the apertures as the bits are too large and thus, generally, undesirable. The apertures may be on the order of millimeters in size and the apertures 24 of the separation 22 may all be of the same size and shape, or alternatively may be of varying sizes and shapes. For example, the apertures 24 may have a cross-sectional geometric shape such as a circle or square or other shape.

Also within the separation unit 22 is a shaft 20 extending along at least a portion of a longitudinal length of the housing 34. This shaft 20 may be configured with bristles or another protrusion or mechanism 21 configured to force any raw or ground consumable material loaded in the separation unit 22 downwardly through apertures 24 to the pollen screen 28 and outlet end or nozzle 32. Electrical components 14, such as a battery and motor, coupled to the shaft 20 are configured to rotate the shaft 20. The bristles or protrusions 21 on the shaft 20 are oriented to force or move the ground consumable material through apertures 24 towards the pollen screen 28 and pollen collection area 30 as well as the nozzle/funnel of the outlet end 32. The bristles may be configured for breaking up the raw consumable material and reducing the size of the raw consumable material as at least a portion of the supply of ground consumable material passes through the apertures 24. The raw consumable material is fed to the separation unit 22 and is pushed through the apertures 24 to extract ground consumable material having a dimension smaller than the dimension of the apertures and to retain the undesirable raw material larger that said apertures 24 within the separation unit 22.

The apparatus 10 comprises a third holding area 30 to store the pollen available from the ground consumable material collected via a mesh screen 28 placed below the separation unit 22.

The outlet end 32 may comprise the funnel which is configured to deliver prepared ground consumable material, for example, crushed or ground consumable material particles having a size at least as small as the apertures 24 to a smoking device. This material is referred to herein as "prepared material" which is ground consumable material particles having a size smaller than the apertures within the separation unit 22. The device into which this prepared material may be delivered may be a device configured for smoking the prepared material.

It is further contemplated that device can prepare the prepared material automatically and can be activated by touch button.

The device 10 described herein is configured for automatically preparing a ground consumable material. The prepared material may have any variety of end uses as the apparatus 10 is an automatic grinder configured to clean and easy delivery of the prepared material. The material may be prepared for smoking, wherein the apparatus 10 can repeat the method quickly. The apparatus 10 comprise an outer shell or housing 34 and a separating unit 14-30 and all components may be comprised of plastic, metal, rubber based materials, or a combination thereof. The outer shell 34 protects the separating unit 14-30 which is configured to hold the raw consumable material while simultaneously pushing ground bits of raw consumable material through apertures 24, thus extracting all unwanted raw materials larger than a selected size. The outer shell 34 further comprises a funnel 32 to aid in the delivery of prepared ground consumable material to a smoking device.

Although the present disclosure has been described with reference to preferred embodiments, workers skilled in the art will recognize that changes may be made in form and detail without departing from the spirit and scope of the disclosure.

The invention claimed is:

1. An apparatus for automatically preparing a ground consumable material, the apparatus comprising:
    a housing comprising;
    a first holding area configured to store a supply of raw consumable material;
    a separation unit configured to extract ground consumable material and pollen from unwanted raw material;
    a second holding area configured to hold unwanted raw material larger than a selected size;
    a third holding area configured to hold pollen collected from the ground consumable material; and
    a funnel configured to deliver ground consumable material, wherein the prepared consumable material is raw consumable material having passed through the separation unit and into a device configured to receive the prepared ground consumable material; and
    a removable cap for closing an inlet end of the housing.

2. The apparatus of claim 1 wherein the separation unit further comprises a shaft adapted with bristles configured to pulverize the raw consumable material by forcing small bits of ground consumable material through at least one of a plurality of apertures as the shaft rotates.

3. The apparatus of claim 2, and further comprising an electric motor and battery within the cap, the electric motor and battery configured to rotate a mechanism configured to engage the shaft to rotate the shaft for separation.

4. The apparatus of claim 1, wherein the separation unit further comprises a screen with apertures configured to collect the pollen from the ground consumable material.

5. The apparatus of claim 1, wherein the consumable material is a plant based material.

6. The apparatus of claim 1, wherein the consumable material is a synthetic material.

7. The apparatus of claim 1, where in the device is a smoking device.

8. The apparatus of claim 1 wherein the separation unit further comprises a plate adapted with protrusions configured to pulverize the raw consumable material by forcing small bits of ground consumable material through at least one of a plurality of apertures.

9. The apparatus of claim 8 wherein the plate is a retractable plate.

10. The apparatus of claim 1 wherein the separation unit further comprises bristles oriented to pulverize the raw consumable material by moving the ground consumable material through at least one of a plurality of apertures.

11. A method of automatically preparing a ground consumable material for smoking, the method comprising:
    loading a supply of raw consumable material into a grinding device housing;
    extracting at least a portion of the ground consumable material in a separation unit of the grinding device housing by passing at least some of the portion of the ground consumable material in the separation unit through an aperture;
    rotating a shaft having protrusions extending outwardly therefrom to extract at least the portion of the ground consumable material from the separation unit while leaving raw material larger than the aperture in the separation unit and further delivering the extracted portion of the ground consumable material to a screen for filtering pollen or other contaminates from the ground consumable material;
    delivering ground consumable material smaller than a selected size based on a size of the aperture to a device; and
    wherein touching a button on a cap for the grinding device housing automatically completes extracting at least a portion of the ground consumable material and passing at least some of the portion of the ground consumable material through the aperture and delivering ground consumable material.

12. The method of claim 11 and further comprising storing at least a portion of the raw consumable material in the grinding device.

13. The method of claim 11, wherein the consumable material is a plant based material.

14. The method of claim 11, wherein the consumable material is a synthetic material.

* * * * *